United States Patent [19]
Weiss et al.

[11] 3,819,936
[45] June 25, 1974

[54] POWER MEASURING AND FUEL LEAKAGE DETECTION SYSTEM

[75] Inventors: Harald H. Weiss, Vienna, Austria; Rau Gopal, Monroeville, Pa.

[73] Assignee: Westinghouse Electric Corporation, Pittsburgh, Pa.

[22] Filed: Aug. 12, 1971

[21] Appl. No.: 171,107

[52] U.S. Cl. ............................. 250/83.3 R, 250/83.1
[51] Int. Cl. ............................. G01t 1/16, G01t 3/00
[58] Field of Search ........ 250/83.1, 83.3 R, 83.6 FT

[56] References Cited
UNITED STATES PATENTS

| | | | |
|---|---|---|---|
| 3,234,385 | 2/1966 | Campbell | 250/83.6 FT X |
| 3,514,598 | 5/1970 | Youmans | 250/83.3 R |
| 3,612,872 | 10/1971 | Omohundro et al. | 250/83.3 R X |

*Primary Examiner*—Archie R. Borchelt
*Attorney, Agent, or Firm*—D. C. Abeles

[57] ABSTRACT

An $N^{16}$ reactor power measuring system is disclosed for measuring the thermal power of a nuclear reactor in the presence of fission product activity in the primary coolant. Furthermore, the system provides a fast response signal for the indication of any leaking fuel within the reactor core.

8 Claims, 3 Drawing Figures

3,819,936

POWER MEASURING AND FUEL LEAKAGE DETECTION SYSTEM

BACKGROUND OF THE INVENTION

This invention pertains in general to nuclear reactor radiation monitoring systems and more particularly, to such a system that measures the $N^{16}$ power signal in the presence of fission product activity and provides a fast response signal for the indication of leaking fuel.

In the presence of leaking fuel within the reactor core, the $N^{16}$ power signal shows an increase due to additional gamma radiation emanating from the fission products within the reactor coolant originating from leaking fuel. Since the additional signal increase due to the fission products from leaking fuel cannot be predicted, the $N^{16}$ signal is no longer a reliable reactor power information source. An additional problem is to obtain a fast response fuel leakage signal which is independent of reactor power level and allows the plant operator to take further action on plant operations to limit radioactive exposure within the reactor containment.

A method for measuring the thermal power of a nuclear reactor utilizing the $N^{16}$ gamma activity in the coolant has already been described in application Ser. No. 102,617, filed Dec. 30, 1970, entitled, "$N^{16}$ Reactor Power Measuring System" and assigned to the assignee of the present invention. However, besides the 6 and 7 MeV gamma rays emitted from $N^{16}$, which is induced from oxygen 16 by the bombardment of very fast neutrons in the reactor core, there are several sources of additional gamma radiation in the primary coolant. The $N^{17}$ neutron emission within the coolant, which originates from neutron bombardment of deterium within the reactor coolant, provides captured gamma radiation of approximately 6 MeV from $(n, \gamma)$ processes in the coolant pipe walls. The fission products resulting from uranium surface contamination of the fuel rods provides additional gamma radiation and into gamma radiation converted delayed neutrons. Furthermore, low energy gamma rays from crud in the coolant provide a general gamma background in the detector area. In the presence of leaking fuel, two additional sources of gamma radiation are encountered. The first source of gamma radiation emanates from the released fission products from failed fuel in the coolant which provides radiation of energies between approximately 0.05 and 3 MeV. The second source of gamma radiation is in the form of captured gamma radiation with energies of approximately 6 MeV emanating from $(n, \gamma)$ processes within the coolant piping caused by delayed neutrons from leaking fuel.

The gamma radiation from $N^{17}$ $(n, \gamma)$ processes is proportional to the reactor power level. Therefore, no need exists to discriminate against this radiation in making power measurements. The radiation resulting from surface contamination is small and almost power proportional, so that it needs no special consideration. Low energy gammas are considerably attenuated by the steel wall of the primary coolant pipe before they reach the $N^{16}$ detectors, thus no significant influence on the $N^{16}$ signal is experienced.

The remaining two gamma radiation sources emanating from failed fuel, however, can disturb the $N^{16}$ signal. While the relatively low energy gamma rays from fission products are considerably attenuated by the coolant pipe wall, the high energy gammas from the $(n, \gamma)$ processes reach the $N^{16}$ detector and are responsible for disrupting the power measurement signal. There is no effective way of discriminating between the 6 and 7 MeV gammas from $N^{16}$ and captured gamma rays.

Fuel leakage monitoring in the primary coolant loop cannot be accomplished by gamma radiation measurements because of the high $N^{16}$ activity and other gamma background in the coolant. Another possibility, used in the past, is to measure the delayed neutron activity from fission products. However, the $N^{17}$ activity (4.14 second half life) can be quite high, and therefore mask the delayed neutron activity, especially in the case of a small fuel leakage.

Because of the discrimination problems, both methods, the gamma and delayed neutron technique, are not wellsuited for proper fuel leakage monitoring. Another method disclosed in copending application Ser. No. 171,108 filed Aug. 12, 1971, entitled, "Nuclear Failed Fuel Detection System," makes use of two neutron detectors at different location in the primary coolant system. The ratio of the two detector signals is used to indicate the presence of fission products within the coolant. The response time of this system, however, is reported as high as 120 seconds.

Presently, fuel leakage is detected on an on-line basis by a delayed neutron system which is connected to the primary loop by means of a special delay line to allow the $N^{16}$ activity to decay. The response time of this system is about 110 seconds. No fast leaking fuel detection system is presently available.

SUMMARY OF THE INVENTION

In order to overcome the disadvantages of the prior art and provide a reactor power measuring and fast response fuel breakage detection system, this invention employs two detector channels for monitoring the radioactivity within the reactor coolant loop. The first channel utilizes a gamma detector for monitoring the gamma signals emitted from the $N^{16}$ activity in the coolant as well as the other gamma emitters. The second channel utilizes a neutron detector for monitoring the $N^{17}$ signal within the coolant as well as neutrons emitted from fission products originating from failed fuel.

In the absence of leaking fuel, the signal from the gamma channel is proportional to the power level as is the $N^{17}$ signal in the neutron channel. Thus, part of the signal from the gamma channel is used to compensate the $N^{17}$ signal in the neutron channel so that the output of the neutron channel becomes zero and remains zero for all power levels in the absence of failed fuel. As soon as leaking fuel is present, the output of the neutron channel becomes proportional to the amount of fission products in the coolant indicating the presence of failed fuel within the reactor core. Part of this signal is then used to compensate for the signal increase in the gamma channel due to leaking fuel. Thus, the output of the gamma channel remains proportional to the $N^{16}$ activity, independent of fission products present in the coolant due to leaking fuel and the output of the neutron channel is an indication of the presence of leaking fuel.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
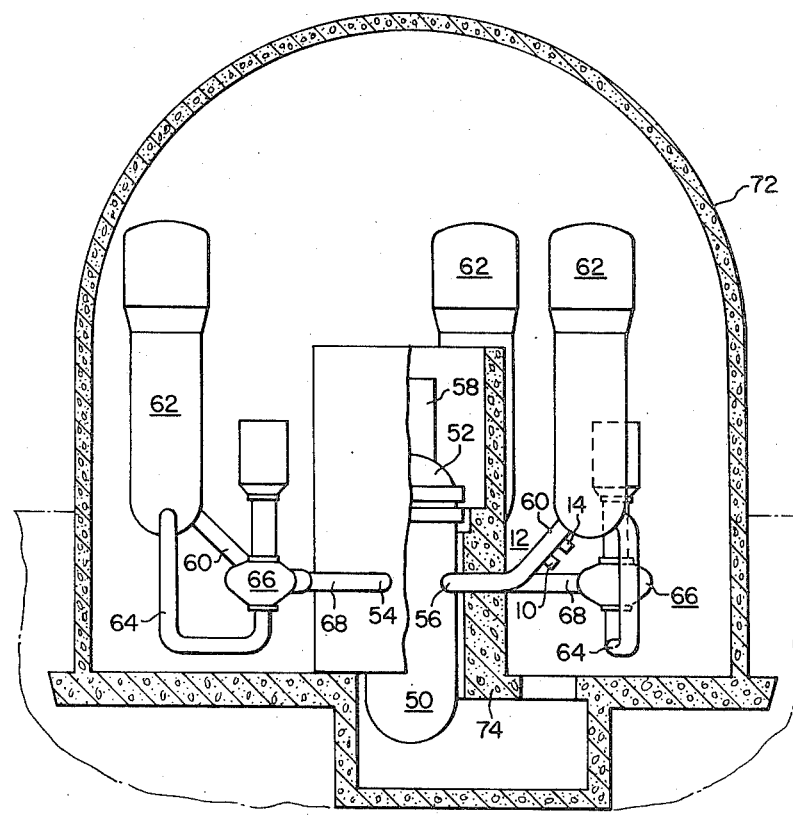
FIG. 1 is a side view, partially in section of a nuclear steam generating system incorporating this invention.

Referring to FIG. 1, there is illustrated a nuclear steam generating system of the pressurized water type incorporating the $N^{16}$ power measuring and fuel leakage detection system of this invention. A pressurized vessel 50 is shown which forms a pressurized container when sealed by its head assembly 52. The vessel 50 has coolant flow inlet means 54 and coolant flow outlet means 56 formed integral with and through its cylindrical walls. As is known in the art, the vessel 50 contains a nuclear core (not shown) which generates substantial amounts of heat depending primarily upon the position of a control means; the pressure vessel housing 58 of which, is shown. The heat generated by the reactor core is conveyed from the core by the coolant flow entering through inlet means 54 and exiting through outlet means 56.

The flow exiting through outlet means 56 is conveyed through hot leg conduit 60 to a heat exchange steam generator 62. The steam generator 62 is of a type wherein the heated coolant flow is conveyed through tubes (not shown) which are in heat exchange relationship with the water which is utilized to produce steam. The steam produced by generator 62 is commonly utilized to drive a turbine (not shown) for the production of electricity. The flow is conveyed from the steam generator 62 through conduit 64 to a pump 66 from which it proceeds through cooled leg conduit 68 to inlet means 54. Thus it can be seen that a closed recycling primary or steam generating loop is provided with the coolant piping, generically described by reference character 12, communicably coupling the vessel 50, the steam generator 62, and the pump 66. The generating system illustrated in FIG. 1 has three such closed fluid flow systems or loops. The number of such systems should be understood to vary from plant to plant, but only two, three or four are employed at present. The nuclear reactions taking place in the nuclear core of the vessel 50 generate substantial amounts of radioactive by-products, previously described, which are transported by the coolant through the coolant loop piping 12. A number of the isotopes, as previously described, are power dependent, and thus provide a source of measurement of the power within the reactor. Additionally, the fission products present in the coolant, generated from leaking fuel, provide an indication of the presence of fuel failures. It is essential for the safe and efficient operation of a reactor power plant that a constant source of power monitoring be provided and an indication of fuel leakage be obtained to guard against excessive amounts of radiation being released into the reactor containment 72. In order to protect against an excessive release of radioactivity due to failed fuel and provide a convenient reliable source for power measurement, this invention provides a power measurement and fuel leakage detection system which will be explained in detail with regard to the description of FIG. 2. According to this invention, two detectors 10 and 14 are provided within the reactor containment structure 72 adjacent the coolant piping 12, preferably outside of the reactor missile barrier 74. The detectors 10 and 14, responsive to the gamma and neutron radiation emitted from the coolant, respectively, are desirably placed along the hot leg conduit 60 upstream of the steam generator 62, so that the detectors are responsive to the radioactivity in the coolant before the activity decays to a negligible level.

Figure 2:
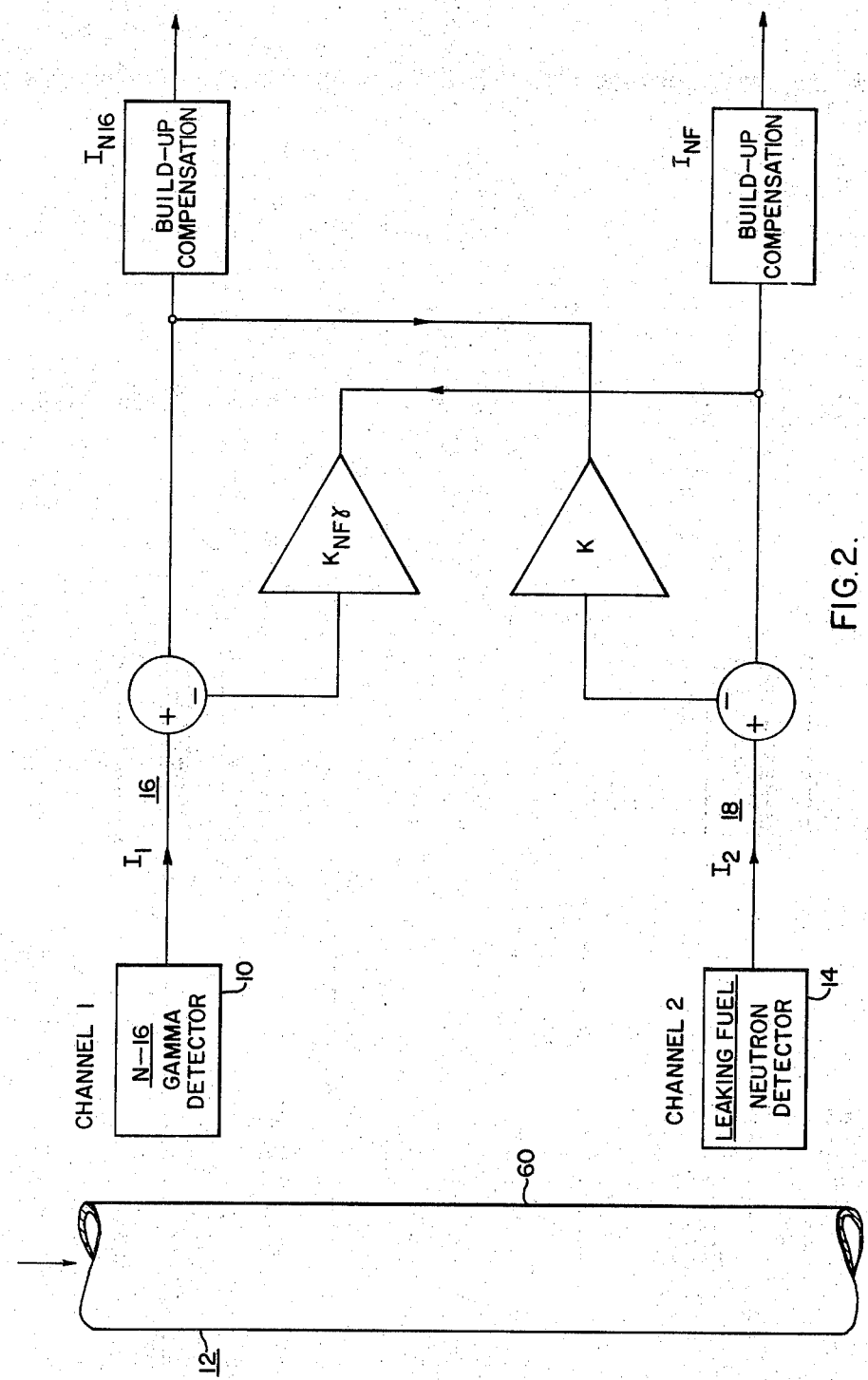
FIG. 2 is a schematic illustration of the detector system of this invention.

FIG. 2 is a schematic diagram of an enlarged section of the coolant piping 12, shown in FIG. 1, illustrating an exemplary embodiment which may be employed to practice this invention. In its broadest scope, this invention contemplates the use of two channels, one gamma channel and one neutron channel; calculating the true power signal and leaking fuel signal from the measured information obtained therefrom. The calculation can be performed by an analog circuit as illustrated in FIG. 2 or by digital techniques well known in the art.

Conventional detectors, sensitive to high energy gammas, such as gamma ion chambers, crystal detectors, etc., can be employed as the detector 10 in the gamma channel 16. All neutron sensitive detectors, such as fission chambers, $BF_3$ counters, etc., which are suited to operate in a high energy gamma background can be employed in the leaking fuel channel 18. The neutron detector 14 is desirably mounted close to the gamma detector 10 on the hot leg of the coolant loop 60. Alternately, a single detector may be employed having a gamma and neutron sensitive section similar to a compensated ion chamber.

In the case of no leaking fuel, the signal from the gamma detector 10 in channel 16, responsive to the $N^{16}$ gamma radiation in the coolant, is proportional to the power level of the reactor as is the signal from detector 14 in channel 18 which is responsive to the $N^{17}$ activity within the coolant. Thus, part of the signal from channel 16 can be used to compensate the $N^{17}$ signal in channel 18, so that the output of channel 18 becomes zero and remains zero for all power levels in the absence of leaking fuel. As soon as leaking fuel is present, the output of channel 18 becomes proportional to the amount of fission products in the coolant due to leaking fuel. Part of the signal from channel 18 can be used to compensate the signal increase in channel 16 due to leaking fuel. Thus, the output of channel 16, remains proportional to the $N^{16}$ activity, which is proportional to the reactor power, independent of fission products present as a result of leaking fuel.

The signals in channels 16 and 18 can be represented as follows:

In Channel 16 (N-16 gamma channel);

$$I_1 = I_{N16} + I_{NF\lambda}$$

In Channel 18 (leaking fuel neutron channel)

$$I_2 = I_{N17} + I_{NF}.$$

Where:

$I_{N16}$ equals the gamma signal due to the $N^{16}$ activity in the coolant. $I_{N16}$ also contains a signal due to $N^{17}$ captured gamma rays which is also proportional to power as is the $N^{16}$ signal.

$I_{N17}$ equals the neutron signal due to the $N^{17}$ activity in the coolant. The assumption can be made that $I_{N17}$ also contains the delayed neutron signal due to uranium surface contamination which is also proportional to reactor power.

$I_{NF}$ equals the delayed neutron signal due to fission products in the coolant resulting from leaking fuel.

$I_{NF}$ equals the gamma radiation due to fission products in the coolant resulting from failed fuel.

The constants K and $K_{NF\lambda}$, illustrated in FIG. 2, are required for setting the proper signal levels for subtraction to compensate for the power proportional signal contribution from $N^{17}$ and uranium surface contamination in channel 18 and the component signal contribution from failed fuel in channel 16, respectively, and are defined as:

$$K = I_{N17}/I_{N16};$$

$$K_{NF\lambda} = I_{NF\lambda}/I_{NF}.$$

K can be obtained from measurements of $I_1$ and $I_2$ at any convenient power level before the presence of leaking fuel; where $I_1$ is the gamma detector signal received from detector 10 and $I_2$ is the neutron signal received from detector 14. Under these conditions, $I_1$ and $I_2$ become:

$$I_1 = I_{N16}; \text{ and}$$

$$I_2 = I_{N17}.$$

Substituting these values into the aforedescribed equation:

$$K = I_{N17}/I_{N16} = I_2/I_1.$$

Before the presence of leaking fuel, $K_{NF\lambda}$ can only be estimated from calculations. However, this estimated value may be used as an initial setting during the beginning of plant operation. Of course, an incorrect value for $K_{NF\lambda}$ will not affect the $N^{16}$ signal because the output of channel 18 is zero, thus, no signal will be subtracted from the signal in channel 16. The final adjustment for $K_{NF\lambda}$ will be made using the measured data for $I_1$ and $I_2$ after the appearance of leaking fuel. $K_{NF\lambda}$ can then be obtained from:

$$K_{NF\lambda} = (I_1 - I_{N16})/(I_2 - KI_{N16});$$

where $I_{N16}$ is known for the power level where $I_1$ and $I_2$ were initially measured.

With the proper values of K and $K_{NF\lambda}$, the output of both channels become:

The output of channel 16 equals $I_{N16}$, which equals $$I_1 - I_{NF}K_{NF\lambda};$$

The output of the leaking fuel channel 18 equals $$I_{NF} = I_2 - KI_{N16}$$

Figure 3:
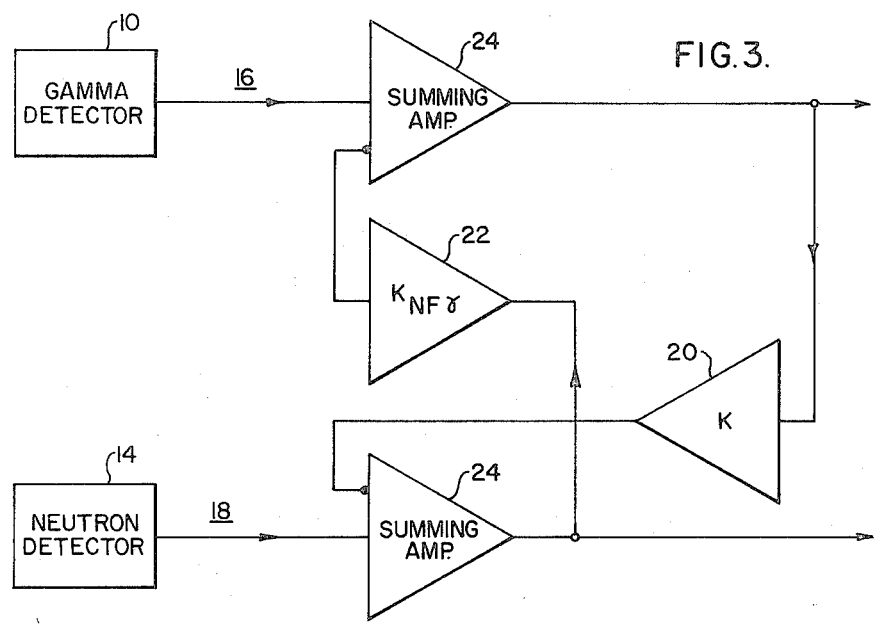
FIG. 3 is a schematic of the compensation system illustrated in FIG. 2.

$I_{N16}$ is the required $N^{16}$ signal which is proportional to the reactor power level. $I_{NF}$ is a measure for the fission product activity in the coolant due to leaking fuel. It should be understood that the value of the constants K and $K_{NF\lambda}$ may be provided by compatible amplifiers 20 and 22 with gains equal to the respective constants and that the subtraction may be accomplished by using summing-amplifiers 24 with a negative input as illustrated in FIG. 3.

Furthermore, where the total transport time in the coolant loop is too short to allow for the complete decay of the monitored radioactivity, a build-up compensation system may be employed in the outputs of the detector circuits of this invention to compensate for the residual activity within the coolant. Such a compensation system has been previously described with reference to application Ser. No. 102,617, entitled, "$N^{16}$ Reactor Power Measuring System" by Harald H. Weiss, filed Dec. 30, 1970, and assigned to the assignee of the present invention.

The response time for the indication of leaking fuel is determined by the transport time of the coolant from the core to the detector assembly (approximately two seconds for a pressurized water reactor) and the time constant of the associated electronics (in the order of five seconds). It should be noted that two different time constants can be applied for the leaking fuel signal $I_{NF}$ and the compensation signal $K_{NF\lambda} I_{NF}$. While the time constant for $I_{NF}$ may be chosen small (three to five seconds) to obtain fast response of the system, the time constant for $K_{NF\lambda} I_{NF}$ can be greater (ten to twenty seconds) to allow for additional electronic filtering to protect the $N^{16}$ power signal from additional noise.

Thus, a system has been provided which compensates the $N^{16}$ power signal for contributions from fission product radiation due to failed fuel and thus provides a truly proportional power signal. Furthermore, the system thus described provides a fast response signal for the indication of leaking fuel.

We claim as our invention:

1. A nuclear reactor power measuring and fuel leakage detection system for monitoring the radioactivity within the reactor coolant comprising:
   means for monitoring the radioactivity emanating from the reactor coolant and providing a first and second output signal responsive to the gamma and neutron activity within the coolant, respectively;
   a first means for compensating said first signal for the component contribution from failed fuel and for providing a compensated first signal substantially proportional to the reactor power; an
   a second means for compensating said second signal for the component contributions from $N^{16}$, $N^{17}$ and uranium surface contamination and for providing a compensated second signal indicative of failed fuel within the reactor.

2. The apparatus of claim 1 wherein the reactor has a coolant loop and said monitoring means comprises:

a gamma detector positioned in proximity to the reactor coolant loop for providing said first signal; and
   a neutron detector, positioned in proximity to the reactor coolant loop substantially adjacent said gamma detector for providing said second signal.

3. The apparatus of claim 1 wherein the reactor has a coolant loop having a hot and cold leg and said monitoring means is positioned in proximity to the hot leg thereof.

4. The apparatus of claim 1 wherein said first compensation means generates a third signal derived from said compensated second signal and subtracts said third signal from said first signal to provide said compensated first signal and wherein said second compensation means generates a fourth signal derived from said compensated first signal and subtracts said fourth signal from said second signal to provide said compensated second signal.

5. The apparatus of claim 4 wherein said fourth signal equals:

$$I_4 = I_{21}/I_{11} \times I_{1c};$$

where: $I_{21}$ equals said second signal in the absence of failed fuel at a first reactor power level; $I_{11}$ equals said first signal in the absence of failed fuel at said first reactor power level; and $I_{1c}$ equals said compensated first signal.

6. The apparatus of claim 5 wherein said second compensation means comprises:
- an amplifier with a gain $I_4/I_{1c}$, having an input from said first compensated signal; and
- a summing amplifier having a negative input from said amplifier and a positive input from said second signal.

7. The apparatus of claim 5 wherein said third signal equals:

$$I_3 = I_1 - I_{11}/I_2 - I_{21} \times I_{2c};$$

where: $I_1$ equals said first signal in the presence of failed fuel at said first reactor power level; and $I_{2c}$ equals said compensated second signal.

8. The apparatus of claim 7 wherein said first compensation means comprises:
- an amplifier with a gain $I_3/I_{2c}$, having an input from said compensated second signal; and
- a summing amplifier having a negative input from said amplifier and a positive input from said first signal.

* * * * *